(12) United States Patent
Kazmi et al.

(10) Patent No.: US 12,470,962 B2
(45) Date of Patent: Nov. 11, 2025

(54) METHODS OF LOGGING EARLY MEASUREMENT CARRIER STATUS

(71) Applicant: TELEFONAKTIEBOLAGET LM ERICSSON (PUBL), Stockholm (SE)

(72) Inventors: Muhammad Ali Kazmi, Sundbyberg (SE); Iana Siomina, Täby (SE); Christopher Callender, Kinross (GB); Pradeepa Ramachandra, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 401 days.

(21) Appl. No.: 17/798,845

(22) PCT Filed: Feb. 10, 2021

(86) PCT No.: PCT/IB2021/051098
§ 371 (c)(1),
(2) Date: Aug. 10, 2022

(87) PCT Pub. No.: WO2021/161196
PCT Pub. Date: Aug. 19, 2021

(65) Prior Publication Data
US 2023/0090309 A1    Mar. 23, 2023

Related U.S. Application Data

(60) Provisional application No. 62/972,435, filed on Feb. 10, 2020.

(51) Int. Cl.
*H04W 24/10* (2009.01)
*H04W 24/02* (2009.01)
(52) U.S. Cl.
CPC .......... *H04W 24/10* (2013.01); *H04W 24/02* (2013.01)

(58) Field of Classification Search
CPC .............................. H04W 24/10; H04W 24/02
See application file for complete search history.

(56) References Cited

U.S. PATENT DOCUMENTS

| | | |
|---|---|---|
| 2018/0368018 A1 | 12/2018 | Kim et al. |
| 2020/0396633 A1* | 12/2020 | Tseng ............... H04L 5/001 |

(Continued)

OTHER PUBLICATIONS

3GPP TS. 1333 V16.4.0—3rd Generation Partnership Project, Technical Specification Group Radio Access Network, Evolved Universal Terrestrial Radio Access (E-UTRA), Requirements for support of radio resource management Release 16, pp. 166-167, Dec. 2019 (Year: 2019).*

(Continued)

*Primary Examiner* — Redentor Pasia
(74) *Attorney, Agent, or Firm* — Sonoda & Kobayashi Intellectual Property Law; Darren M. Gardner (57) ABSTRACT

Systems and methods are disclosed herein for logging of measurement results performed while a wireless communication device is in an inactive or idle state such that the logged information includes information that indicates a status of the respective carrier when logging the measurement results. In one embodiment, a method performed by a wireless communication device comprises receiving a measurement configuration(s) for performing early measurement on a carrier and performing the early measurement on the carrier in accordance with the measurement configuration(s) to provide measurement results. The method further comprises logging the measurement results along with information that indicates a status of the carrier when logging the measurement results. By logging the information that indicates the status of the carrier when logging the measurement results, operations performed based on the measurement results can be more reliable.

14 Claims, 6 Drawing Sheets

(56) References Cited

U.S. PATENT DOCUMENTS

| | | | | |
|---|---|---|---|---|
| 2020/0404521 A1* | 12/2020 | Kim | ........................ | H04W 24/08 |
| 2021/0006981 A1* | 1/2021 | Van Der Velde | ..... | H04W 48/06 |
| 2021/0051506 A1* | 2/2021 | Lee | ........................ | H04W 48/10 |
| 2021/0345144 A1* | 11/2021 | Yang | ........................ | H04W 24/10 |
| 2022/0248349 A1* | 8/2022 | Cheng | .................. | H04W 24/10 |

OTHER PUBLICATIONS

Ericsson et al., "On UE requirements for NR MDT", 3GPP TSG-RAN WG4 Meeting #94-e, R4-2001951, Electronic Meeting, February 24-Mar. 6, 2020.

Ericsson, "On logged MDT related enhancements", 3GPP TSG-RAN WG2 Meeting #112-e, R2-2010035, Online meeting, Nov. 2-13, 2020.

Huawei et al., "Discussion on early measurement", 3GPP TSG-RAN WG4 Meeting #93, R4-1914950, Reno, US, Nov. 18-22, 2019.

Spreadtrum Communications, "Early measurement in NR-U", 3GPP TSG-RAN WG2 Meeting #107bis, R2-1912237, Chongqing, China, Oct. 14-18, 2019.

* cited by examiner

METHODS OF LOGGING EARLY MEASUREMENT CARRIER STATUS

RELATED APPLICATIONS

This application is a national phase application of International Patent Application No. PCT/IB2021/051098, filed Feb. 10, 2021, which claims the benefit of U.S. Provisional Patent App. No. 62/972,435, filed Feb. 10, 2020, the disclosures of which are hereby incorporated herein by reference in their entirety.

TECHNICAL FIELD

The present disclosure relates to early measurement reporting in a radio access network of a cellular communications system.

BACKGROUND

In Third Generation Partnership Project (3GPP) Long Term Evolution (LTE), early measurement reporting was introduced for RRC_IDLE state on Evolved Universal Terrestrial Radio Access (E-UTRA) carrier/cell level. The User Equipment (UE), which is capable of early measurement reporting, is configured with the early measurements via dedicated signaling in Radio Resource Control (RRC) Release message or broadcast (System Information Block 5 (SIB5)). Such measurements are performed by UE in RRC_IDLE state. Thus, early measurement reporting is also referred to herein as idle (or inactive) mode measurement reporting and, likewise, early measurements are also referred to herein as idle mode (or inactive mode) measurements. The UE knows that a cell supports early measurement reporting via a cell support indication in System Information Block 2 (SIB2). Validity area configuration is optional. The UE indicates measurement availability for early measurement reporting in Msg5 (RRC Setup Complete). The early measurement reporting occurs when the UE is in RRC_CONNECTED state and is implemented through UEInformationRequest/Response messaging.

The UE is provided with a list of carrier frequencies (easIdleCarrierListEUTRA) and performs early measurements for each entry in measIdleCarrierListEUTRA, provided the UE supports carrier aggregation between the serving carrier and the carrier frequency and bandwidth indicated by carrierFreq and allowedMeasBandwidth within the corresponding entry. Otherwise (e.g., for a combination for which the UE does not support carrier aggregation), the UE does not consider the carrier frequency to be applicable for early measurement reporting.

If the UE is provided with the cell list (measCellList) for early measurements, then the UE considers the serving cell and cells identified by each entry within the measCellList to be applicable for early measurement reporting. Otherwise, the UE considers the serving cell and up to maxCellMeasIdle strongest identified cells whose Reference Signal Received Power (RSRP)/Reference Signal Received Quality (RSRQ) measurement results are above the value(s) provided in qualityThreshold (if any) to be applicable for such measurements.

A duration timer T331, which in current standards is a value in the range of 10-300 seconds, was introduced. The value of the duration timer T331 is provided to the UE via dedicated RRC signaling. If T331 expires or is stopped, the UE releases the dedicated configuration for early measurements, but it is up to UE implementation as to whether to continue such measurements according to SIB5 configuration after T331 has expired or stopped. According to the 3GPP Technical Specification (TS) 36.133 v15.8.0, while T331 is running, the UE is to perform such measurements on the configured overlapping and non-overlapping inter-frequency carriers; in the absence or expiration of T331, it is up to UE implementation to perform such measurements.

1.1. New Radio (NR)

In Release 16, early measurement reporting is being introduced for measurements on E-UTRA and NR carriers to facilitate multi-carrier operation with NR, e.g., NR Carrier Aggregation (CA) or Multi-Radio Access Technology (RAT) Dual Connectivity (MR-DC). The measurements can be performed in RRC_IDLE or RRC_INACTIVE. The measurement report should preferably be sent as early as possible, but the UE is not allowed to send information that can be used to determine UE location before security activation. This implies that a UE coming from RRC_IDLE can send the measurement report after SecurityModeCommand, a UE coming from RRC_IDLE with stored context (LTE Release 13) can send the measurement report after processing the RRC Resume message, and a UE coming from NR RRC_INACTIVE can send the measurement report after transmission of the RRC Resume Request message (i.e., before reception of the RRC Resume message). In a first option (Option 1), the UE sends the measurement report immediately after the SecurityModeCommand. In a second option (Option 2), the UE sends the measurement report after the RRCConnectionReconfigurationComplete/RRCReconfigurationComplete message.

For RRC_INACTIVE, in Option 1, UEInformationRequest/Response can be used after resume to request early measurements. In Option 2, the network can request early measurements in RRCResume, and the UE then reports early measurements in RRCResumeComplete.

In both LTE and NR, the purpose of early measurement reporting is to enable the network node (e.g., serving enhanced or evolved NodeB (eNB)) to use the results to quickly setup or establish multicarrier operation (e.g., carrier aggregation, multi-connectivity, etc.); that is to configure the UE with one or more SCells and/or special cell (spSCell) such as PSCell. These SCells can then also be directly activated. Without early measurement reporting, the network node (e.g., serving eNB) has to configure the UE to perform and report measurements on one or more carriers after the UE is in the connected state, only after which SCells can be configured and then activated. This significantly delays the setup of carrier aggregation.

Minimization of Drive Tests (MDT) is used as an alternative to the drive tests for obtaining certain types of UE measurements results for Self-Organizing Network (SON) related features such as network planning, network optimization, network parameter tuning or setting (e.g., base station transmit power, number of receive and/or transmit antennas etc.), or even for positioning (e.g., RF pattern matching based positioning). The UE is configured by the network for logging the measurements. Two MDT modes exist: immediate MDT and logged MDT. Immediate MDT comprises performing measurements at UE in the high RRC activity states (e.g., RRC CONNECTED state in LTE and NR, etc.) and reporting the measurements to a network node (e.g., eNB, NR base station (gNB), etc.) when a reporting condition is met, e.g. event is triggered. Logged MDT functionality comprises performing measurements at UE when operating in a low RRC activity state (e.g., RRC idle, RRC inactive, etc.). The network uses a Logged Measurement Configuration message to configure the UE to perform logging of measurement results in low RRC activity state, where the measurement results can be stored in the UE for up to 48 hours before reporting. The configuration comprises information such as absolute time in the cell, logging duration, logging interval or periodicity (e.g., how often the measurements are logged), information about area where logging is required, etc. The logging duration can vary from few minutes to several hours. The UE transmits the measurement results along with relative time stamp for each log, which indicates the time of logging measurement results relative to the absolute time received (received from the network), location information of the logged results (optional), etc.

SUMMARY

Systems and methods are disclosed herein for logging of measurement results performed while a wireless communication device is in an inactive or idle state such that the logged information includes information that indicates a status of the respective carrier when logging the measurement results. In one embodiment, a method performed by a wireless communication device comprises receiving a measurement configuration(s) for performing early measurement on a carrier and performing the early measurement on the carrier in accordance with the measurement configuration(s) to provide measurement results. The method further comprises logging the measurement results along with information that indicates a status of the carrier when logging the measurement results. By logging the information that indicates the status of the carrier when logging the measurement results, operations performed based on the measurement results can be more reliable.

In one embodiment, the carrier is different than a carrier (F1) on which a serving cell of the wireless communication device operating. In another embodiment, the carrier is the same as a carrier (F1) on which a serving cell of the wireless communication device is operating.

In one embodiment, the method further comprises using the logged measurement results and the information that indicates the status of the carrier when logging the measurement results to perform one or more operational tasks. In one embodiment, using the logged measurement results and the information that indicates the status of the carrier when logging the measurement results comprises sending, to another node, a measurement report that comprises the logged measurement results and the information that indicates the status of the carrier when logging the measurement results. In another embodiment, using the logged measurement results and the information that indicates the status of the carrier when logging the measurement results comprises using the logged measurement results and the information that indicates the status of the carrier when logging the measurement results locally at the wireless communication device to perform one or more operational tasks.

In one embodiment, the information that indicates the status of the carrier when logging the measurement results comprises information that indicates whether the carrier is an overlapping carrier or a non-overlapping carrier. In one embodiment, an overlapping carrier is a carrier frequency which is configured for a cell change procedure in low activity state and also configured for early measurement reporting. In one embodiment, an overlapping carrier is a carrier which the wireless communication device is actively measuring for mobility and early measurement reporting. In one embodiment, a non-overlapping carrier is a carrier frequency which is configured for early measurement reporting but is not configured for any cell change procedure in low activity state. In one embodiment, a non-overlapping carrier is a carrier which the wireless communication device is actively measuring for early measurement reporting only.

In one embodiment, the status of the carrier changes over time while performing the measurements.

In one embodiment, the information that indicates the status of the carrier when logging the measurement results comprises explicit indications associated with the respective measurement results. In another embodiment, the information that indicates the status of the carrier when logging the measurement results comprises information that serves as implicit indications of the status of the carrier when logging the respective measurement results. In another embodiment, the information that indicates the status of the carrier when logging the measurement results comprises information that indicates certain events related to changing the status of the carrier.

In one embodiment, the measurement configuration(s) comprise measuring configurations for early measurement reporting for a plurality of carriers comprising the carrier, and the method further comprises prioritizing measurements on ones of the plurality of carriers having a particular status. In one embodiment, the particular status is a status as an overlapping carrier.

Corresponding embodiments of a wireless communication device are also disclosed. In one embodiment, a wireless communication device is adapted to receive a measurement configuration(s) for performing early measurement on a carrier and perform the early measurement on the carrier in accordance with the measurement configuration(s) to provide measurement results. The wireless communication device is further adapted to log the measurement results along with information that indicates a status of the carrier when logging the measurement results.

In one embodiment, a wireless communication device comprises one or more transmitters, one or more receivers, and processing circuitry associated with the one or more transmitters and the one or more receivers. The processing circuitry is configured to cause the wireless communication device to receive a measurement configuration(s) for performing early measurement on a carrier and perform the early measurement on the carrier in accordance with the measurement configuration(s) to provide measurement results. The processing circuitry is further configured to cause the wireless communication device to log the measurement results along with information that indicates a status of the carrier when logging the measurement results.

Embodiments of a method performed by a network node are also disclosed. In one embodiment, a method performed by a network node comprises providing, to a wireless communication device, a measurement configuration for early measurement reporting including logging of measurement results along with information that indicates a status of a respective carrier when logging the measurement results.

In one embodiment, the status of the respective carrier when logging the measurement results is either that the respective carrier is an overlapping carrier or a non-overlapping carrier. In one embodiment, an overlapping carrier is a carrier frequency which is configured for cell change procedure in low activity state and also configured for early measurement reporting. In another embodiment, an overlapping carrier is a carrier which the wireless communication device is actively measuring for mobility and early measurement reporting. In one embodiment, a non-overlapping carrier is a carrier frequency which is configured for early measurement reporting but is not configured for any cell change procedure in low activity state. In another embodiment, a non-overlapping carrier is a carrier which the wireless communication device is actively measuring for early measurement reporting only.

In one embodiment, the method further comprises receiving a measurement report from the wireless communication device, the measurement report comprising logged measurement results and information that indicates the status of the respective carrier when the wireless communication device logged the measurement results, and performing one or more actions based on the measurement report. In one embodiment, the one or more actions depend on the status of the respective carrier when the wireless communication device logged the measurement results.

Corresponding embodiments of a network node are also disclosed. In one embodiment, a network node is adapted to provide, to a wireless communication device, a measurement configuration for early measurement reporting including logging of measurement results along with information that indicates a status of a respective carrier when logging the measurement results.

In one embodiment, a network node comprises processing circuitry configured to cause the network node to provide, to a wireless communication device, a measurement configuration for early measurement reporting including logging of measurement results along with information that indicates a status of a respective carrier when logging the measurement results.

In another embodiment, a method performed by a network node comprises receiving a measurement report from a wireless communication device, the measurement report comprising logged measurement results and information that indicates a status of a respective carrier when the wireless communication device logged the measurement results. The method further comprises performing one or more actions based on the measurement report.

In one embodiment, the status of the respective carrier when logging the measurement results is either that the respective carrier is an overlapping carrier or a non-overlapping carrier. In one embodiment, an overlapping carrier is a carrier frequency which is configured for cell change procedure in low activity state and also configured for early measurement reporting. In another embodiment, an overlapping carrier is a carrier which the wireless communication device is actively measuring for mobility and early measurement reporting. In one embodiment, a non-overlapping carrier is a carrier frequency which is configured for early measurement reporting but is not configured for any cell change procedure in low activity state. In another embodiment, a non-overlapping carrier is a carrier which the wireless communication device is actively measuring for early measurement reporting only.

Corresponding embodiments of a network node are also disclosed. In one embodiment, a network node is adapted to receive a measurement report from a wireless communication device, the measurement report comprising logged measurement results and information that indicates a status of a respective carrier when the wireless communication device logged the measurement results, and perform one or more actions based on the measurement report.

In one embodiment, a network node comprises processing circuitry configured to cause the network node to receive a measurement report from a wireless communication device, the measurement report comprising logged measurement results and information that indicates a status of a respective carrier when the wireless communication device logged the measurement results, and perform one or more actions based on the measurement report.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

In some embodiments, a more general term "network node" is used and it can correspond to any type of radio network node or any network node, which communicates with a UE and/or with another network node. Examples of network nodes are radio network node, gNodeB (gNB), ng-eNB, base station (BS), NR base station, TRP (transmission reception point), multi-standard radio (MSR) radio node such as MSR BS, network controller, radio network controller (RNC), base station controller (BSC), relay, access point (AP), transmission points, transmission nodes, RRU, RRH, nodes in distributed antenna system (DAS), core network node (e.g. MSC, MME, etc.), O&M, OSS, SON, positioning node or location server (e.g. E-SMLC), MDT, test equipment (physical node or software), etc. A radio network node is network node capable of transmitting radio signals, e.g., base station, gNB, etc.

In some embodiments the non-limiting term user equipment (UE) or wireless device is used, and it refers to any type of wireless device communicating with a network node and/or with another UE in a cellular or mobile communication system. Examples of UE are wireless device supporting NR, target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), drone, USB dongles, ProSe UE, V2V UE, V2X UE, etc.

The term "radio node" may refer to radio network node or UE capable of transmitting radio signals or receiving radio signals or both.

The term time resource used herein may correspond to any type of physical resource or radio resource expressed in terms of length of time or time interval or time duration. Examples of time resources are: symbol, mini-slot, time slot, subframe, radio frame, TTI, interleaving time, etc.

The term TTI used herein may correspond to any time period over which a physical channel can be encoded and interleaved for transmission. The physical channel is decoded by the receiver over the same time period (TO) over which it was encoded. The TTI may also interchangeably called as short TTI (sTTI), transmission time, slot, sub-slot, mini-slot, short subframe (SSF), mini-subframe etc.

The UE performs measurements on reference signal (RS). Examples of RS are SSB, CSI-RS, CRS, DMRS, PSS, SSS etc. Examples of measurements cell identification (e.g. PCI acquisition, cell detection), Reference Symbol Received Power (RSRP), Reference Symbol Received Quality (RSRQ), secondary synchronization RSRP (SS-RSRP), SS-RSRQ, SINR, RSSINR, SS-SINR, CSI-RSRP, CSI-RSRQ, acquisition of system information (SI), cell global ID (CGI) acquisition, Reference Signal Time Difference (RSTD), UE RX-TX time difference measurement, Radio Link Monitoring (RLM), which consists of Out of Synchronization (out of sync) detection and In Synchronization (in-sync) detection etc. CSI measurements performed by the UE are used for scheduling, link adaptation etc. by network. Examples of CSI measurements or CSI reports are CQI, PMI, RI etc. They may be performed on reference signals like CRS, CSI-RS or DMRS.

The term overlapping carrier (OC) used herein may correspond to a carrier frequency which is configured for cell change procedure in low activity state (e.g., for cell reselection in RRC idle state and/or in RRC inactive state, etc.) and also the same carrier configured for early measurement reporting (EMR). In another example, an OC is a carrier configured by higher layer for early measurement reporting and inter-frequency mobility measurements. In another example, an OC is a carrier which the UE is actively measuring for mobility and EMR.

In one example if the carrier configured for EMR has the same frequency channel number as that of at least one carrier configured for cell change, then that carrier configured for EMR is called as the OC. The UE is configured with frequency channel number by the network node. Examples of frequency channel number are ARFCN, EARFCN, NR ARFCN, SSB number (e.g., GSCN) etc. The term OC may also interchangeably be called as overlapping carrier frequency, overlapping frequency layer etc. In another example if the centre frequency of the SSB of the carrier configured for EMR and the centre frequency of the SSB of at least one carrier frequency configured for the cell change are the same, and the subcarrier spacing of the two SSBs are also the same then that carrier configured for EMR is called as the OC. In yet another example if the centre frequency of the CSI-RS resource of the carrier configured for EMR and the centre frequency of the CSI-RS resource of at least one carrier frequency configured for the cell change are the same, and the subcarrier spacing of the two CSI-RS resources are also the same then that carrier configured for EMR is called as the OC. The OC may be an intra-frequency carrier, inter-frequency carrier, an inter-RAT carrier.

The term non-overlapping carrier (NOC) used herein may correspond to a carrier frequency which is configured for EMR but is not configured for any cell change procedure in low activity state (e.g., not for cell reselection in RRC idle state and/or in RRC inactive state). In another example, a NOC is a carrier configured by higher layer for early measurement reporting while not configured for inter-frequency mobility measurements. In another example, a NOC is a carrier which the UE is actively measuring for EMR only. The EMR carrier which is not an OC carrier is a NOC. The NOC may also be an intra-frequency carrier, inter-frequency carrier, or an inter-RAT carrier.

The embodiments are described for multi-carrier operation with NR, including intraRAT multi-carrier operation and multi-RAT multi-carrier operation (e.g., EN-DC, NE-DC, etc.). However, the embodiments are applicable to earlier measurement reporting with any other single-RAT or multi-RAT systems, where a UE receives and/or transmit signals (e.g., data), e.g. NR, LTE FDD/TDD, WCDMA/HSPA, WiFi, WLAN, LTE, 5G, etc.

There currently exist certain challenge(s). The UE can be configured for performing EMR on cells of one or more carriers (referred to herein as EMR carriers) over a very long period, e.g. over the time controlled by timer T331 which according to current 3GPP specifications can be up to 300 seconds. The UE performs the early measurements (also referred to herein as EMR measurements) in low activity state (e.g., in RRC idle state, RRC inactive state, etc.). In low activity state, the UE also autonomously performs cell reselection and for which it performs the measurements. The same EMR carrier may also be configured for cell reselection. However, the UE may not perform measurements on an EMR carrier concurrently for both EMR and cell reselection. For example, at a given time, the configured EMR carrier may be measured only for EMR or for both EMR and cell reselection. The EMR carrier can therefore be an overlapping carrier (OC) or a non-overlapping carrier (NOC). In general, the same EMR carrier can change from OC to NOC or vice versa over time, for example when the UE measurement configuration is updated after reading system information. The UE may use different measurement procedures (e.g., different measurement rates/sampling) for measuring OC and NOC carriers and, therefore, OC and NOC carriers are associated with different requirements. In an extreme, yet realistic implementation, the UE may only perform EMR measurements once it becomes aware that it will transition from the low activity state to a higher activity state (e.g., from RRC idle or RRC inactive to RRC connected state), in preparation for reporting possible EMR results during the connection setup or resume. On the other hand, reselection measurements are required whenever the configured measurement threshold conditions for the serving cell are not met, according to 3GPP TS 38.304 v15.6.0. Furthermore, even the EMR measurement requirements can be different depending on whether the carrier is OC or NOC, with the requirements for NOC being more relaxed.

Therefore, the existing procedures used for logging the measurements in low activity state do not provide necessary information for enabling the network to interpret the logged results. The network heavily relies on logged measurement results for network planning. This in turn may lead to incorrect network planning and suboptimal setting of network parameters. The absence of a reselection neighbor measurement can be interpreted by the network based on network knowledge of the configured measurement results, along with the UE logged serving cell measurements. However, the absence of EMR results cannot be interpreted by the network in the same way since the EMR measurement trigger would not depend on serving cell measurements. Hence, it is not possible to conclude from the absence of a cell in the EMR report whether the UE is out of coverage on the given frequency, or it is in coverage but not performing the measurement at that time. In addition, with the requirements being more relaxed for NOC, it would be very helpful for the network to know whether a measurement is EMR measurement on NOC or not, to understand how the measurement was performed, implication on its quality, and how can the measurement be used. Hence, the network is likely to use differently the logged information and to make a different decision based on a received log if it knows, e.g. which measurements were EMR measurements on NOC, compared to when it does not know.

Certain aspects of the present disclosure and their embodiments may provide solutions to the aforementioned or other challenges. Methods in a UE configured by the network node for logging results of measurements performed on a carrier configured for EMR are disclosed herein. Corresponding embodiments of a UE are also disclosed.

According to a first embodiment, the UE served by (or camped on) a first cell (cell1) on a first carrier (F1) performs one or more measurements on at least a second carrier (F2) configured for EMR and logs measurement results along with at least information indicative of the status of F2 at the time of logging the measurement results. The status of F2 indicates whether F2 was an overlapping carrier (OC) or non-overlapping carrier (NOC) at the time of logging the measurements.

The main motivation behind logging the carrier status stems from the fact that the measurement requirements depend on the carrier status. Therefore, without such information, the network receiving the logged results cannot adequately interpret and appropriately apply the results for SON function (e.g., network optimization etc.) or positioning.

The UE further uses the logged information comprising measurement results and associated information for one or more operational tasks. Examples of tasks comprises transmitting the logged information to the network node, using the results for determining its location, etc.

Methods in a network node are also disclosed. Corresponding embodiments of a network node are also disclosed. For example, in one embodiment, a network node that receives a first information indicative of the status of F2 (the first information may also comprise no information, in a special case) performs a first action, while a network node that receives a second information indicative of the status of F2 performs a second action. A network node may also configure logging of the information indicative of the status of F2 for one or more UE. The configuring may further be for UE supporting such capability to log this information, wherein the UE can provide such capability to the network node upon its request or in unsolicited way. A network node may also maintain and indicate its capability to configure and/or receive/interpret the information indication of the status of F2.

Certain embodiments may provide one or more of the following technical advantage(s):

Embodiments disclosed herein may enable the logged measurement results for EMR carriers reported to the network node to be consistent and well defined.

Embodiments disclosed herein may enable the network to interpret the results of measurements performed by the UE on EMR carriers regardless of whether the carriers were overlapping or non-overlapping at the time of the measurements.

Embodiments disclosed herein may ensure that network planning based on logged measurement results for EMR carriers is more reliable and optimal by allowing the network planning to differentiate between the case where the UE is measuring the EMR carrier, but out of coverage, and the case where the UE is not measuring the EMR carrier.

Figure 1:
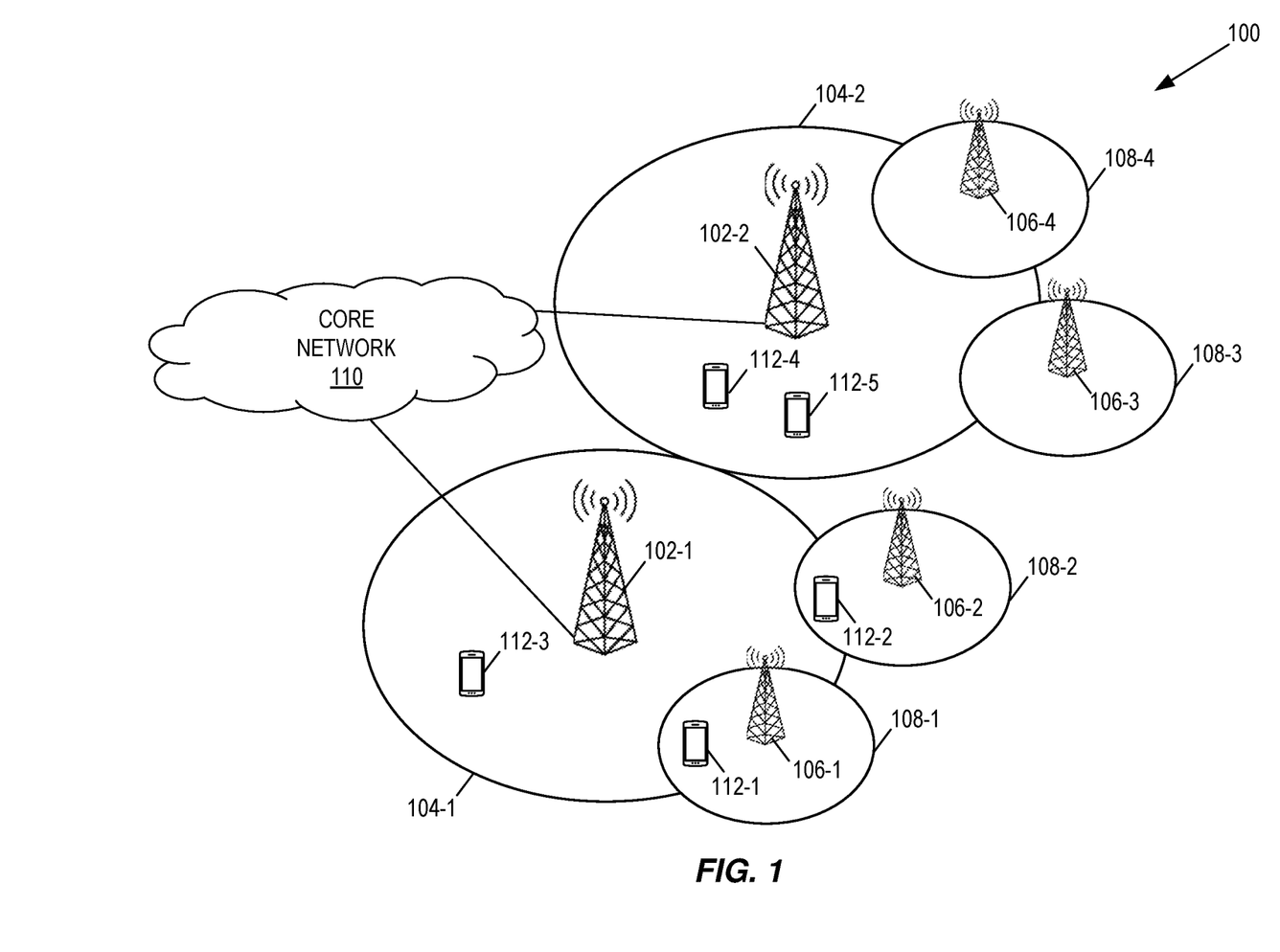
FIG. 1 illustrates one example of a cellular communications system in which embodiments of the present disclosure may be implemented.

FIG. 1 illustrates one example of a cellular communications system 100 in which embodiments of the present disclosure may be implemented. In the embodiments described herein, the cellular communications system 100 is a 5G system (5GS) including a Next Generation RAN (NG-RAN) which includes NR base stations (gNBs) and optionally ng-eNBs (i.e., LTE RAN nodes connected to 5GC). However, the present disclosure is not limited to a 5GS. Rather, the embodiments described herein may be implemented in other types of cellular communications systems (e.g., an Evolved Packet System (EPS) including an E-UTRAN (i.e., an LTE RAN)). In this example, the RAN includes base stations 102-1 and 102-2, which in the 5GS are referred to as gNBs or ng-eNBs, controlling corresponding (macro) cells 104-1 and 104-2. The base stations 102-1 and 102-2 are generally referred to herein collectively as base stations 102 and individually as base station 102. Likewise, the (macro) cells 104-1 and 104-2 are generally referred to herein collectively as (macro) cells 104 and individually as (macro) cell 104. The RAN may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The cellular communications system 100 also includes a core network 110, which in the 5GS is referred to as the 5G core (5GC). The base stations 102 (and optionally the low power nodes 106) are connected to the core network 110.

The base stations 102 and the low power nodes 106 provide service to wireless communication devices 112-1 through 112-5 in the corresponding cells 104 and 108. The wireless communication devices 112-1 through 112-5 are generally referred to herein collectively as wireless communication devices 112 and individually as wireless communication device 112. In the following description, the wireless communication devices 112 are oftentimes UEs and as such oftentimes referred to as UEs 112, but the present disclosure is not limited thereto.

Now, a description of some example embodiments of the present disclosure is provided. These embodiments are generally applicable to the following scenario. The scenario comprises a UE (e.g., a UE 112) served by a first cell (cell1), which is managed or served by a network node, operating on a first carrier frequency (F1) is configured by cell1 for performing measurements on at least a second carrier (F2) for EMR. The UE is further configured to log one or more measurements performed by the UE on F2. The status of the second carrier, F2, may change over time, implying that F2 may become an overlapping carrier (OC) or it may become a non-overlapping carrier (NOC) over time. In one example, F2 becomes OC carrier when the UE is also configured with F2 for performing measurements for mobility purpose (e.g., cell change, cell reselection procedure, etc.). In another example, F2 becomes NOC carrier when the UE is configured with F2 for performing measurement only for EMR. In one example, the UE may assume that F2 is OC if the UE is configured by the network node for performing measurements on F2 for mobility purpose (e.g., cell reselection etc.); otherwise F2 is assumed to be NOC. In one example, the UE may assume that F2 is OC only if the UE is actually or actively performing measurements on F2 for mobility (e.g., cell reselection); otherwise F2 is assumed to be NOC. The measurements for EMR are also interchangeably referred to herein as idle mode carrier aggregation (CA) measurements, idle mode dual connectivity (DC) measurements, idle mode EUTRA-NR DC (EN-DC) measurements, idle mode NR-EUTRA DC (NE-DC) measurements, inactive mode CA measurements, inactive mode DC measurements, inactive mode EN-DC measurements, inactive mode NE-DC measurements, idle/inactive mode CA measurements, idle/inactive mode DC measurements, idle/inactive mode EN-DC measurements, idle/inactive mode NE-DC measurements, etc.

The UE may further perform cell reselection to a target cell, e.g. from cell1 to a second cell (cell2). Cell2 may belong to F1 or to a third carrier (F3) configured for cell reselection. In one example, F1 and/or F3 may be the same as F2 (i.e., OC) or they may be different than F2.

Methods in UE of Logging EMR Measurements and Carrier Status

According to an embodiment, the UE (e.g., UE 112) is configured to perform one or more measurements on F2 and to log the measurement results along with at least information about the status of F2 at the time of logging the results. The UE may initiate the logging upon receiving the logging configuration message from the network node, e.g. from cell1. The status of F2 comprises an indicator indicating whether F2 was an overlapping carrier (OC) or a non-overlapping carrier (NOC) at the time when the measurements were logged. The UE may further be configured to log additional information such as time instance (Tg) when the measurements were logged. The time instance, Tg, can be an absolute time (e.g., UTC time) and/or it can be a relative time or relative time stamp (Tg=$\Delta T$), e.g. time with respect to a reference time (Tr). For example, Tr can be the absolute time in cell1 when the UE is configured by the network to log the measurements performed on F2. The UE may further be configured to log additional information such as location (e.g., geographical area) at which the measurements on F2 were logged and/or further measurements of any type and on any frequency which may be used later to estimate the location where the UE performed the measurement on F2. The UE uses the logged information for one or more operational tasks, e.g. transmitting the information to another node (e.g., to the network node, to another UE, etc.), using the results for internal operational such as positioning, determining the UE trajectory, etc.

Figure 2:
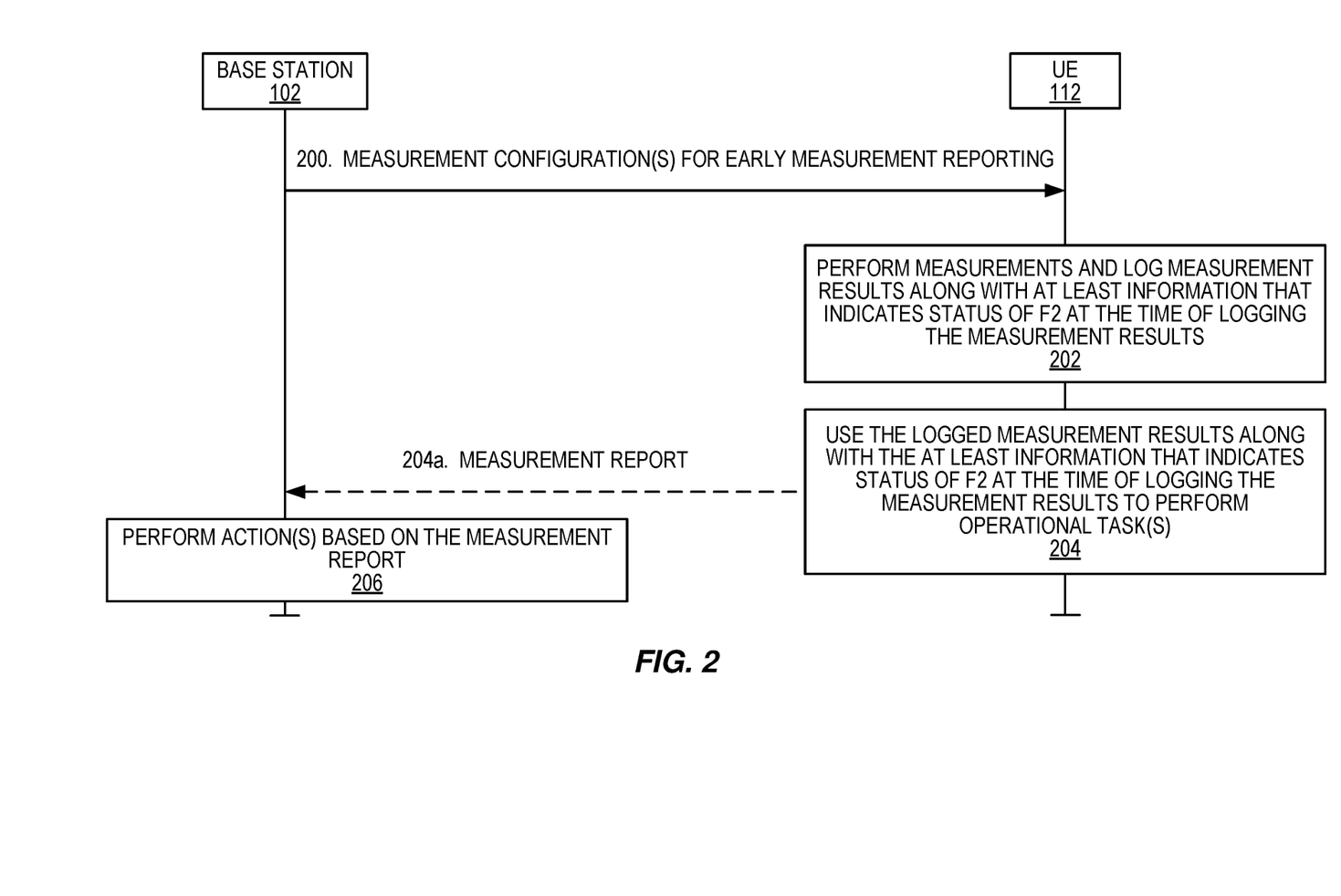
FIG. 2 illustrates the operation of a User Equipment (UE) for logging early measurement reporting (EMR) measurements and carrier status in accordance with embodiments of the present disclosure.

FIG. 2 illustrates the operation of a UE (e.g., a UE 112) for logging EMR measurements and carrier status in accordance with some embodiments of the present disclosure. As illustrated, the UE receives (e.g., from a network node such as, e.g., a base station such as, e.g., a gNB) a measurement configuration(s) for early measurement reporting (step 200). The measurement configuration(s) may be received in dedicated signaling (e.g., in an RRC Release message), in broadcast signaling (e.g., SIB), or a combination thereof. In this example, the UE is served by a first cell (cell1) on a first carrier frequency (F1), and the measurement configuration(s) (e.g., configured by cell1) include a configuration for the UE to perform one or more measurements on F2 for early measurement reporting and to log the measurement results along with at least information about the status of F2 at the time of logging the measurement results. The UE performs measurements on F2 and logs the measurement results along with at least information about the status of F2 at the time of logging the measurement results (step 202). As discussed above, the information about the status of F2 is information that indicates whether F2 is an OC or NOC at the time of logging the measurement results. As discussed above, additional information may also be logged (e.g., Tg, location, etc.). The UE then uses the logged measurement results and the at least information about the status of F2 at the time of logging the measurement results to perform one or more operational tasks (e.g., transmitting the information to another node (e.g., to the network node, to another UE, etc.), using the results for internal operational such as positioning, determining the UE trajectory, etc.) (step 204).

As described below with respect to the network node embodiments, in one embodiment, the UE sends, to the base station, the measurement report including the logged measurement results and the at least the information that indicates the status of F2 at the time that the measurement results were logged (step 204a). The base station then performs one or more actions based on the measurement report (step 206). For example, the particular action(s) performed may be a function of the status of F2.

Examples of Logging EMR Carrier Status:

The embodiment is explained with several examples below.

Logging Example #1

Assume that the UE is configured to log results of at least one measurement (e.g., RSRP) on F2 periodically, the relative time with respect to the reference time for each measured value and status of F2 (OC or NOC). A measurement result or value is denoted by $M_j$ where j denotes the $j_{th}$ logged measured value at time instance, $T_j$. The UE logs up to N measured values over the logging duration, e.g. measured values $M_1, M_2, M_3, \ldots M_N$ are logged at time instances $T_1, T_2, T_3, \ldots, T_N$ respectively. Therefore j≤N. Each measured value may also be associated with certain cell ID, i.e. cell on which the measurement is done. The relative time with respect to Tr for logging Mj is denoted as $\Delta T_j$. As an example, $\Delta T_j=(t_j-T_r)$, e.g. $\Delta T_1=(T_1-Tr)$ and so on. As special case, $\Delta T_1=\Delta T_2= \ldots \Delta T_N$, e.g. the logging period or interval may comprise L number of DRX cycle or it can be a fixed value such as 5120 ms or 10240 ms etc. The values of $M_j$ may also correspond to an estimate of the average value of the measurement over a certain time window, rather than an instantaneous value. For example, $M_j$ may correspond to an average of at least H number of measurement samples obtained by the UE, e.g. once every DRX cycle. As an example, H=2.

The status of F2 may change, e.g., due to a change in the set of mobility measurements (changed configuration and/or UE moving) or a change in EMR configuration.

Figure 3:
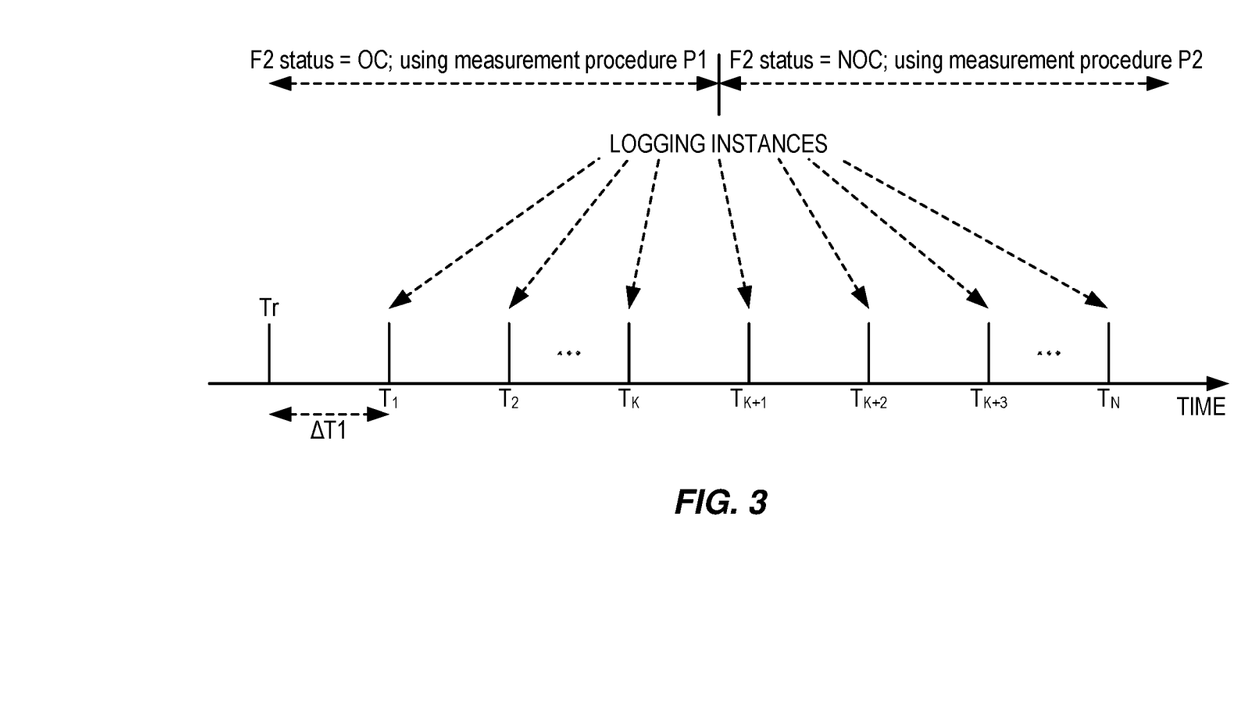
FIG. 3 shows an example where the UE is configured to log the measurement values periodically at multiple logging instances.

FIG. 3 shows an example where the UE is configured to log the measurement values (e.g., $M_j$ such as RSRP) periodically at the logging instances. Until the time instance $T_K$, the carrier F2 is an overlapping carrier. This means that, until $T_K$, the UE also performs measurements on F2 for cell reselection in addition to measurements for EMR. But after the time instance $T_K$, the carrier F2 becomes a non-overlapping carrier. This means that, after $T_K$, the UE does not perform any measurement on F2 for cell reselection, but it continues measuring on F2 only for EMR.

Table 1 illustrates a general example of the logged results where each logged measured value is associated with the status of F2 on which the logged measurement was performed. For example, the logged measured values ($M_1$, $M_2$, ..., $M_K$) were performed on F2 when the status of F2 was OC. On the other hand, the logged measured values ($M_{K+1}$, $M_{K+1}$, ..., $M_N$) were performed on F2 when the status of F2 was NOC. The UE may also log similar information for plurality of cells on F2 on which the measurements are done by the UE.

TABLE 1

A general example of logged measurement results associated with status of F2

| Logged results set ($S_j$) | Measurement result ($M_j$) | Relative time ($\Delta T_j$) | F2 status |
|---|---|---|---|
| 1 | $M_1$ | $\Delta T_1$ | OC |
| 2 | $M_2$ | $\Delta T_2$ | OC |
| ... | ... | ... | ... |
| K | $M_K$ | $\Delta T_K$ | OC |
| K + 1 | $M_{k+1}$ | $\Delta T_{K+1}$ | NOC |
| K + 2 | $M_{K+2}$ | $\Delta T_{k+2}$ | NOC |
| ... | ... | ... | ... |
| N | $M_N$ | $\Delta T_N$ | NOC |

Logging Example #2

Table 2 illustrates a specific example of the logged SS-RSRP values of measurement on a cell on F2 where each logged SS-RSRP value is associated with the status of F2 at the time of logging the SS-RSRP. In this example, the logging is done periodically every 5120 ms for logging duration of 40960 ms, i.e. 8 logged values. As shown in the table, from the start of the logging and up to 20480 ms, the SS-RSRP values are logged on F2 while it was an OC; but, from then onwards until the end of the logging, the F2 status is NOC.

TABLE 2

A specific example of logged SS-RSRP results associated with status of F2

| Logged results set ($S_j$) | SS_RSRP [dBm] | Relative time ($\Delta T_j$) (ms) | F2 status |
|---|---|---|---|
| 1 | −90 | 5120 | OC |
| 2 | −94 | 10240 | OC |

TABLE 2-continued

A specific example of logged SS-RSRP results associated with status of F2

| Logged results set ($S_j$) | SS_RSRP [dBm] | Relative time ($\Delta T_j$) (ms) | F2 status |
|---|---|---|---|
| 3 | −91 | 15360 | OC |
| 4 | −92 | 20480 | OC |
| 5 | −101 | 25600 | NOC |
| 6 | −96 | 30720 | NOC |
| 7 | −94 | 35840 | NOC |
| 8 | −93 | 40960 | NOC |

Logging Example #3

In one example, the EMR status of F2 may be included explicitly in the logged information. In another example, a reserved value may be logged in the measurement results for F2, or the results for at least one cell on F2, when measurements on F2 have not been performed due to the implementation of EMR measurement. A reserved value of a measurement is any value which does not map to a valid measurement result, i.e. cannot be confused with the case that a measurement has been performed. The reserved value may be specified in the measurement report mapping described in TS38.133 v16.2.0., or may be specified in any other 3GPP specification, or may be left to UE implementation.

Logging Example #4

In another example, the EMR status of F2 may not need to be logged with each and every measurement, but a separate log record can be made instead at certain events related to changing the EMR status, e.g., upon (re)configuring EMR measurements, upon changing mobility measurements configuration, upon a UE movement resulted in a coverage change, change in a set of measurements performed by the UE, etc. During the time between these logs, the status may be assumed unchanged and corresponding to the most recent status. The log record may comprise a time stamp and the data indicative of one or more of: set of EMR carriers, set of carriers measured for mobility, set of NOCs, set of OCs, etc.

Logging Example #5

In some embodiments, when only 'X' number of cells can be stored per carrier, the UE prioritizes those cells related measurements that are part of the OC list compared to NOC list. Thus, for example, in step 202 when performing the measurements, the UE may prioritize those cells related to measurements that are on OCs over those cells related to measurements that are on NOCs. Once example reason for prioritizing cells in OC list is that the measurements associated to cells in OC list might be more accurate than the ones in NOC list. For example, if the UE can store up to three cells per neighboring carrier and if the UE has been configured with EMR related reporting for two cells in that carrier, then the UE includes the measurements associated to these two cells, if available. The other cell to be included in the logged report for that frequency could be from those cells in the NOC list. This is illustrated using the measurements associated to different cells on Frequency-X as shown in Table 3.

TABLE 3

A specific example of logged SS-RSRP results of different cells associated with status of Freq-X

| Cell-ID | OC or NOC? | Cell1 SS-RSRP measurements at time = $T_i$ | Whether the measurements associated to the cells are included in the logged MDT when the number of cells to be included per inter-frequency neighbor is 3. |
|---|---|---|---|
| 1 | OC | −90 | YES-this cell is part of OC list |
| 2 | OC | −97 | YES-this cell is part of OC list |
| 3 | NOC | −101 | NO |
| 4 | NOC | −92 | YES-this cell is strongest amongst NOC list |
| 5 | NOC | −101 | NO |
| 6 | NOC | −96 | NO |
| 7 | NOC | −94 | NO |
| 8 | NOC | −93 | NO |

Logging Example #6

In some further embodiments, the cells in the OC list are prioritized over cells in the NOC up to a threshold, 'OC priority threshold'. This threshold may, for example, be either configured by the network or explicitly defined in a specification or up to UE implementation, depending on the amount of resources used for OC cell measurements versus NOC cell measurements. For example, if the UE can store up to three cells per neighboring carrier and if the UE has been configured with EMR related reporting for two cells in that carrier and if the 'OC priority threshold' is '3 dB', then the UE shall include cells in the OC list as long as no other cells from the NOC list is above 3 dB of the cells in the OC list. This is illustrated using the measurements associated to different cells on Frequency-X as shown in Table 4.

TABLE 4

A specific example of logged SS-RSRP results of different cells associated with status of Freq-X (with OC-priority-threshold of 3 dB)

| Cell-ID | OC or NOC? | Cell1 SS-RSRP measurements at time = $T_i$ | Whether the measurements associated to the cells are included in the logged MDT when the number of cells to be included per inter-frequency neighbor is 3. |
|---|---|---|---|
| 1 | OC | −90 | YES-this cell is part of OC list and |
| 2 | OC | −97 | NO-this cell is part of OC list but there are other cells within 3 dB |
| 3 | NOC | −101 | NO |
| 4 | NOC | −92 | YES-this cell is strongest amongst NOC list and stronger than 3 dB of cell-2 |
| 5 | NOC | −101 | NO |
| 6 | NOC | −96 | NO |
| 7 | NOC | −94 | NO |
| 8 | NOC | −93 | YES-this cell is second strongest amongst NOC list and stronger than 3 dB of cell-2 |

Motivation for Logging EMR Carrier Status:

As shown in Table 2, the logged SS-RSRP values do not depict the status of F2. It is important to provide the F2 status information to interpret the results as explained further. The measurement procedure used by the UE for obtaining the EMR measurements depends on the status of the EMR carrier. For example, when F2 status is OC then the UE uses a first procedure (P1) for performing measurements on F2. But when F2 status is NOC then the UE uses a second procedure (P2) for performing measurements on F2, where P1 and P2 are different. In one example when applying P1 the UE allocates more resources for doing the measurements compared to the case when applying P2. This is because in former case the measurements are also used for mobility procedure (e.g., for cell reselection), whereas in latter case the measurements are used only for EMR. Examples of resources are processors, memory units, battery power etc. The measurements on OC carriers may also be done less frequently compared to the measurements on NOC. The reason is the UE performs measurements for mobility only when the serving cell's measurement value (e.g., RSRP) falls below certain threshold (Hs). On the other hand, UE may be configured to perform the EMR measurements even when the serving cell's measurement value is equal to or above Hs. The consequence of applying P1 and P2 when F2 status is OC and NOC respectively, is that the measurements performed by using P1 and P2 may have to be associated with different set of requirements for the same type of measurement (e.g., RSRP). For example, the UE may be required to a meet different set of requirements for performing measurements on cells of F2 depending on whether F2 is an OC or is NOC. Examples of requirements are measurement time of the measurement (e.g., RSRP), measurement accuracy of the measurement, number of carriers and/or identified cells to be measured, signal level down to which the measurement is to be performed, measurement rate (i.e., how often the measurement is done, e.g., once every Qth DRX cycle) etc. Examples of measurement time are cell detection time, physical layer (L1) measurement period, evaluation period, time to acquire the beam index (e.g., SSB index, etc.). The requirements are based on one or more rules, which can be pre-defined (e.g., specified in the standard) and/or configured by the network node.

In one example, the UE has to meet a first set (S1) of requirements for measurements on cells of F2 if F2 is an OC.

In another example, the UE has to meet a second set (S2) of requirements for measurements on cells of F2 if F2 is a NOC. In one example at least one requirement belonging to S2 is more relaxed with respect to the same type of the requirement belonging to S1. For example, the measurement time (e.g., cell detection time (T21)) in set S2 is longer than the measurement time (e.g., cell detection time (T11)) in set S1. As an example, $T21=25*T_{DRX}$ and $T11=20*T_{DRX}$, where $T_{DRX}$ is the DRX cycle length, e.g. $T_{DRX}=1.28$ seconds. In another example the measurement accuracy (e.g., RSRP accuracy (A21)) in set S2 is worse than the measurement accuracy (e.g., RSRP accuracy (A11)) in set S1. A21 is considered worse than A11 if the former has larger deviation with respect to a reference measurement value (e.g., ideal RSRP measured). For example, $A21=\pm 7$ dB is considered to be worse than $A11=\pm 5$ dB.

To meet the set of requirements for measurements done on OC and NOC (as explained above), the value of the measurement (of same type, e.g. RSRP) performed by the UE at the same location and at the same time may differ depending on the status of the EMR carrier (e.g., F2), or may also be absent in some log entries if the measurement is not performed due to UE EMR implementation. Therefore, associating each logged result with the status of F2 enables the network node to interpret the results.

Methods in a Network Node

Methods in a network node are also disclosed, e.g., a network node receiving a first information indicative of the status of F2 (the first information may also comprise no information, in a special case) performs a first action, while a network node receiving a second information indicative of the status of F2 performs a second action (the result of which may be different from that of the first action). For example, in the process of FIG. 2, the UE 112 may, during step 204, send a measurement report to the base station 102, where the measurement report includes the logged measurement results and the associated information that indicates the status of F2 at the time of logging the measurement results (step 204a). The base station 102 then performs one or more actions based on the measurement report that take into account the status of F2 (step 206).

The action(s) performed by the network node may relate, e.g., to SON, O&M, or positioning. Some examples of the actions:
  Concluding the coverage at the UE location when the log occurred (e.g., different coverage conclusions depending on the information),
  Sending the corresponding information to another node,
  Update the coverage information based on the received measurements and the received information,
  An action related to network (re)planning,
  An action of optimizing one or more network parameters,
  An action of optimizing one or more network node configuration (e.g., TRP antenna configuration, base station beamforming configuration, transmit power, number of receive and/or transmit antennas, etc.)
  Updating a database or map which comprises association between a location and a set of measurements or fingerprints.

A network node may also configure logging of the information indicative of the status of F2 for one or more UEs (see, e.g., step 200 of the procedure of FIG. 2 above). The configuring may further be for UE supporting such capability to log this information, wherein the UE can provide such capability to the network node upon its request or in unsolicited way.

A network node may also maintain and indicate to one or more UEs or another network node its capability to configure and/or receive/interpret the information indication of the status of F2.

Additional Aspects

Figure 4:
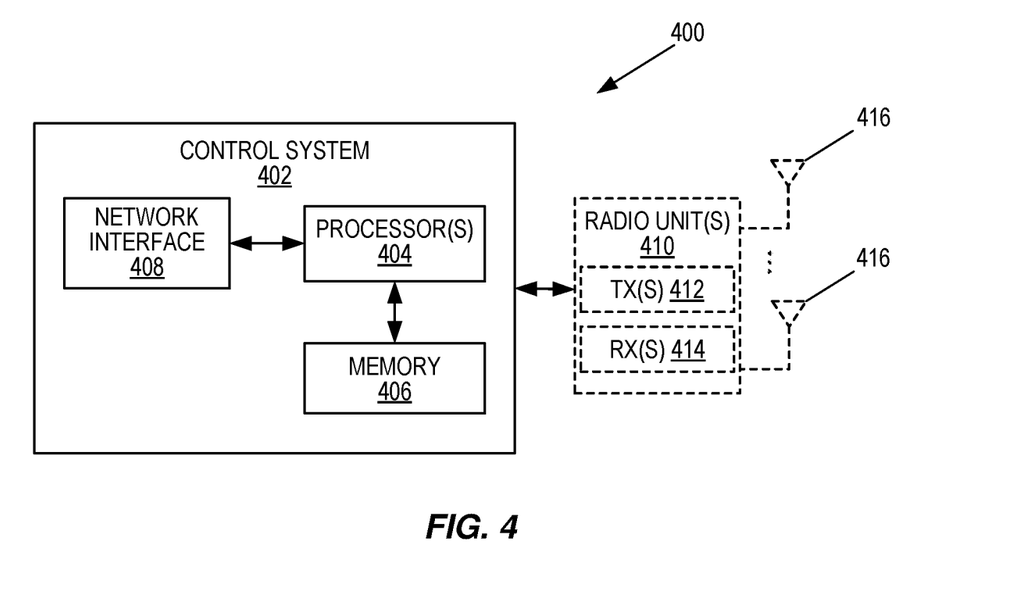
FIGS. 4, 5, and 6 are schematic block diagrams of example embodiments of a radio access node.

FIG. 4 is a schematic block diagram of a radio access node 400 according to some embodiments of the present disclosure. Optional features are represented by dashed boxes. The radio access node 400 may be, for example, a base station 102 or 106 or a network node that implements all or part of the functionality of the base station 102 or gNB described herein. As illustrated, the radio access node 400 includes a control system 402 that includes one or more processors 404 (e.g., Central Processing Units (CPUs), Application Specific Integrated Circuits (ASICs), Field Programmable Gate Arrays (FPGAs), and/or the like), memory 406, and a network interface 408. The one or more processors 404 are also referred to herein as processing circuitry. In addition, the radio access node 400 may include one or more radio units 410 that each includes one or more transmitters 412 and one or more receivers 414 coupled to one or more antennas 416. The radio units 410 may be referred to or be part of radio interface circuitry. In some embodiments, the radio unit(s) 410 is external to the control system 402 and connected to the control system 402 via, e.g., a wired connection (e.g., an optical cable). However, in some other embodiments, the radio unit(s) 410 and potentially the antenna(s) 416 are integrated together with the control system 402. The one or more processors 404 operate to provide one or more functions of a radio access node 400 as described herein (e.g., one or more functions of a network node or base station described herein, e.g., in the section entitled "Methods in a network node" above). In some embodiments, the function(s) are implemented in software that is stored, e.g., in the memory 406 and executed by the one or more processors 404.

Figure 5:
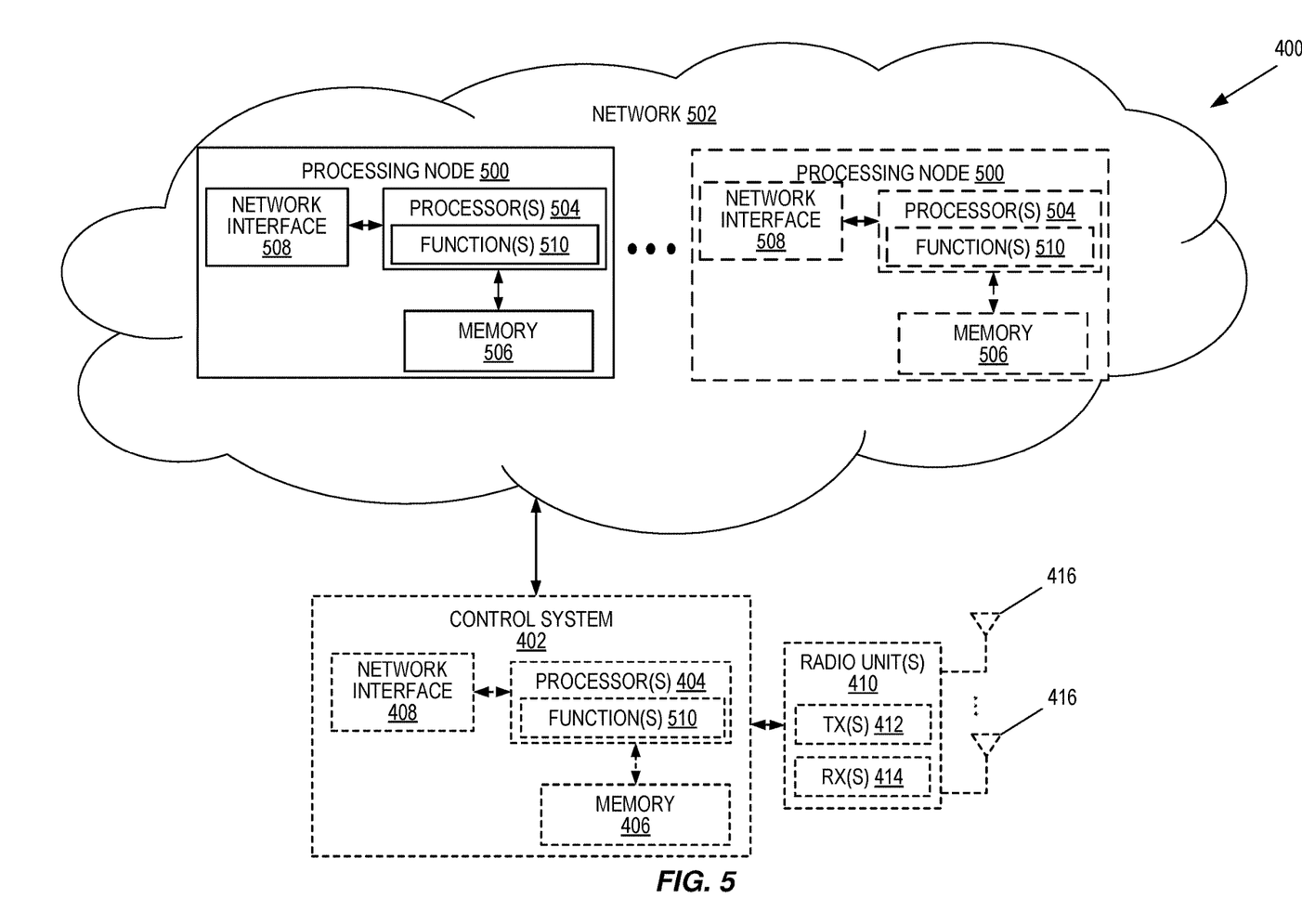

FIG. 5 is a schematic block diagram that illustrates a virtualized embodiment of the radio access node 400 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 400 in which at least a portion of the functionality of the radio access node 400 is implemented as a virtual component(s) (e.g., via a virtual machine(s) executing on a physical processing node(s) in a network(s)). As illustrated, in this example, the radio access node 400 may include the control system 402 and/or the one or more radio units 410, as described above. The control system 402 may be connected to the radio unit(s) 410 via, for example, an optical cable or the like. The radio access node 400 includes one or more processing nodes 500 coupled to or included as part of a network(s) 502. If present, the control system 402 or the radio unit(s) are connected to the processing node(s) 500 via the network 502. Each processing node 500 includes one or more processors 504 (e.g., CPUs, ASICs, FPGAs, and/or the like), memory 506, and a network interface 508.

In this example, functions 510 of the radio access node 400 described herein (e.g., one or more functions of a network node or base station described herein, e.g., in the section entitled "Methods in a network node" above) are implemented at the one or more processing nodes 500 or distributed across the one or more processing nodes 500 and the control system 402 and/or the radio unit(s) 410 in any desired manner. In some particular embodiments, some or all of the functions 510 of the radio access node 400 described herein are implemented as virtual components executed by one or more virtual machines implemented in a virtual environment(s) hosted by the processing node(s) 500. As will be appreciated by one of ordinary skill in the art, additional signaling or communication between the processing node(s) 500 and the control system 402 is used in order to carry out at least some of the desired functions 510. Notably, in some embodiments, the control system 402 may not be included, in which case the radio unit(s) 410 communicate directly with the processing node(s) 500 via an appropriate network interface(s).

In some embodiments, a computer program including instructions which, when executed by at least one processor, causes the at least one processor to carry out the functionality of radio access node 400 or a node (e.g., a processing node 500) implementing one or more of the functions 510 of the radio access node 400 in a virtual environment according to any of the embodiments described herein (e.g., one or more functions of a network node or base station described herein, e.g., in the section entitled "Methods in a network node" above) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 6:
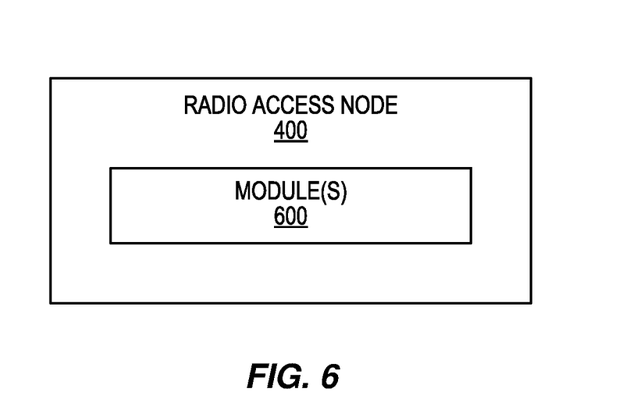

FIG. 6 is a schematic block diagram of the radio access node 400 according to some other embodiments of the present disclosure. The radio access node 400 includes one or more modules 600, each of which is implemented in software. The module(s) 600 provide the functionality of the radio access node 400 described herein (e.g., one or more functions of a network node or base station described herein, e.g., in the section entitled "Methods in a network node" above). This discussion is equally applicable to the processing node 500 of FIG. 5 where the modules 600 may be implemented at one of the processing nodes 500 or distributed across multiple processing nodes 500 and/or distributed across the processing node(s) 500 and the control system 402.

Figure 7:
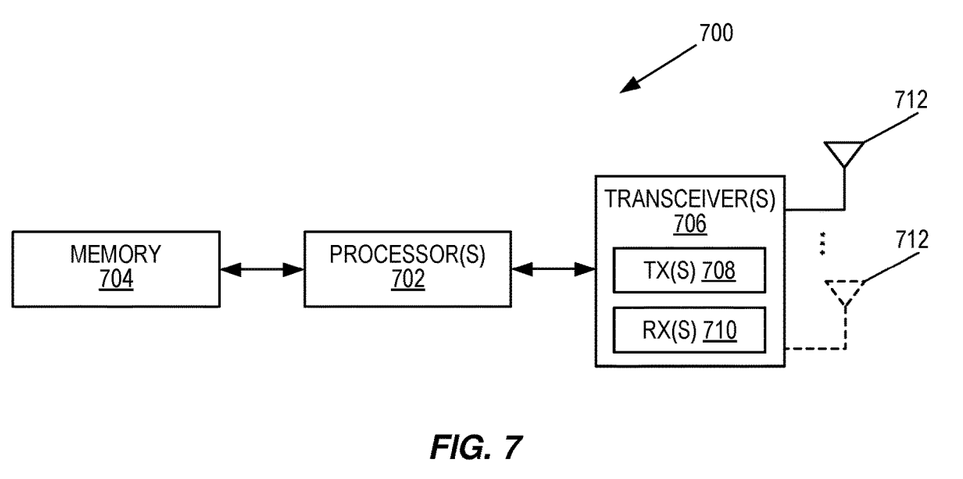
FIGS. 7 and 8 are schematic block diagrams of example embodiments of a UE.

FIG. 7 is a schematic block diagram of a wireless communication device 700 according to some embodiments of the present disclosure. As illustrated, the wireless communication device 700 includes one or more processors 702 (e.g., CPUs, ASICs, FPGAs, and/or the like), memory 704, and one or more transceivers 706 each including one or more transmitters 708 and one or more receivers 710 coupled to one or more antennas 712. The transceiver(s) 706 includes radio-front end circuitry connected to the antenna(s) 712 that is configured to condition signals communicated between the antenna(s) 712 and the processor(s) 702, as will be appreciated by on of ordinary skill in the art. The processors 702 are also referred to herein as processing circuitry. The transceivers 706 are also referred to herein as radio circuitry. In some embodiments, the functionality of the wireless communication device 700 described above (e.g., one or more functions of a UE described herein, e.g., in the section entitled "Methods in UE of logging EMR measurements and carrier status" above) may be fully or partially implemented in software that is, e.g., stored in the memory 704 and executed by the processor(s) 702. Note that the wireless communication device 700 may include additional components not illustrated in FIG. 7 such as, e.g., one or more user interface components (e.g., an input/output interface including a display, buttons, a touch screen, a microphone, a speaker(s), and/or the like and/or any other components for allowing input of information into the wireless communication device 700 and/or allowing output of information from the wireless communication device 700), a power supply (e.g., a battery and associated power circuitry), etc.

In some embodiments, a computer program including instructions which, when executed by at least one processor, causes the at least one processor to carry out the functionality of the wireless communication device 700 according to any of the embodiments described herein (e.g., one or more functions of a UE described herein, e.g., in the section entitled "Methods in UE of logging EMR measurements and carrier status" above) is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
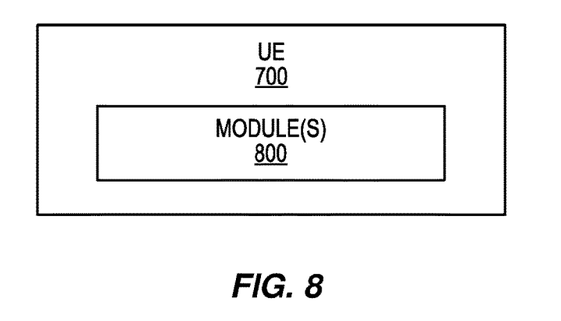

FIG. 8 is a schematic block diagram of the wireless communication device 700 according to some other embodiments of the present disclosure. The wireless communication device 700 includes one or more modules 800, each of which is implemented in software. The module(s) 800 provide the functionality of the wireless communication device 700 described herein (e.g., one or more functions of a UE described herein, e.g., in the section entitled "Methods in UE of logging EMR measurements and carrier status" above).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method performed by a wireless communication device (112; 700), the method comprising: receiving (200) a measurement configuration(s) for early measurement reporting on a carrier (F2); performing (202) measurements on the carrier (F2) in accordance with the measurement configuration(s), thereby providing measurement results; logging (202) the measurement results along with information that indicates a status of the carrier (F2) when logging (202) the measurement results; and using (204) the logged measurement results and the information that indicates the status of the carrier (F2) when logging (202) the measurement results to perform one or more operational tasks.

Embodiment 1A: The method of embodiment 1 wherein the carrier (F2) is different than a carrier (F1) on which a serving cell of the wireless communication device (112; 700) is operating.

Embodiment 1B: The method of embodiment 1 wherein the carrier (F2) is the same as a carrier (F1) on which a serving cell of the wireless communication device (112; 700) is operating.

Embodiment 2: The method of any one of embodiments 1 to 1B wherein using (204) the logged measurement results and the information that indicates the status of the carrier (F2) when logging (202) the measurement results comprises sending (204), to another node (e.g., a network node or another wireless communication device), a measurement report that comprises the logged measurement results and the information that indicates the status of the carrier (F2) when logging (202) the measurement results.

Embodiment 3: The method of any one of embodiments 1 to 1B wherein using (204) the logged measurement results and the information that indicates the status of the carrier (F2) when logging (202) the measurement results comprises using (204) the logged measurement results and the information that indicates the status of the carrier (F2) when logging (202) the measurement results locally at the wireless communication device (112) to perform one or more operational tasks (e.g., positioning, or determining a trajectory of the wireless communication device).

Embodiment 4: The method of any one of embodiments 1 to 3 wherein the information that indicates the status of the carrier (F2) when logging (202) the measurement results comprises information that indicates whether the carrier (F2) is an overlapping carrier or a non-overlapping carrier.

Embodiment 4A: The method of embodiment 4 wherein an overlapping carrier is a carrier frequency which is configured for cell change procedure in low activity state and also configured for early measurement reporting.

Embodiment 4B: The method of embodiment 4 wherein an overlapping carrier is a carrier which the wireless communication device is actively measuring for mobility and early measurement reporting.

Embodiment 4C: The method of any one of embodiments 4 to 4B wherein a non-overlapping carrier is a carrier frequency which is configured for early measurement reporting but is not configured for any cell change procedure in low activity state.

Embodiment 4D: The method of any one of embodiments 4 to 4B wherein a non-overlapping carrier is a carrier which the wireless communication device is actively measuring for early measurement reporting only.

Embodiment 5: The method of any one of embodiments 1 to 4D wherein the status of the carrier (F2) changes over time while performing (202) the measurements.

Embodiment 6: The method of any one of embodiments 1 to 5 wherein the information that indicates the status of the carrier (F2) when logging (202) the measurement results comprises explicit indications associated with the respective measurement results.

Embodiment 7: The method of any one of embodiments 1 to 5 wherein the information that indicates the status of the carrier (F2) when logging (202) the measurement results comprises information (e.g., reserved measurement values) that serve as implicit indications of the status of the carrier (F2) when logging the respective measurement results.

Embodiment 8: The method of any one of embodiments 1 to 5 wherein the information that indicates the status of the carrier (F2) when logging (202) the measurement results comprises information that indicates certain events related to changing the status of the carrier (F2).

Embodiment 9: The method of any one of embodiments 1 to 8 wherein the measurement configuration(s) comprise measuring configurations for early measurement reporting for a plurality of carriers comprising the carrier (F2), and the method further comprises prioritizing measurements on ones of the plurality of carriers having a particular status.

Embodiment 10: The method of embodiment 9 wherein the particular status is a status as an overlapping carrier (e.g., a carrier frequency which is configured for cell change procedure in low activity state and also configured for early measurement reporting or a carrier which the wireless communication device is actively measuring for mobility and early measurement reporting).

Embodiment 11: A method performed by a network node, the method comprising: providing (200), to a wireless communication device (112), a measurement configuration for early measurement reporting including logging of measurement results along with information that indicates a status of a respective carrier when logging the measurement results.

Embodiment 12: The method of embodiment 11 wherein the status of the respective carrier when logging the measurement results is either that the respective carrier is an overlapping carrier or a non-overlapping carrier.

Embodiment 12A: The method of embodiment 12 wherein an overlapping carrier is a carrier frequency which is configured for cell change procedure in low activity state and also configured for early measurement reporting.

Embodiment 12B: The method of embodiment 12 wherein an overlapping carrier is a carrier which the wireless communication device is actively measuring for mobility and early measurement reporting.

Embodiment 12C: The method of any one of embodiments 12 to 12B wherein a non-overlapping carrier is a carrier frequency which is configured for early measurement reporting but is not configured for any cell change procedure in low activity state.

Embodiment 12D: The method of any one of embodiments 12 to 12B wherein a non-overlapping carrier is a carrier which the wireless communication device is actively measuring for early measurement reporting only.

Embodiment 13: The method of any one of embodiments 11 to 12D further comprising: receiving (204a) a measurement report from the wireless communication device, the measurement report comprising logged measurement results and information that indicates the status of the respective carrier when the wireless communication device logged the measurement results; and performing (206) one or more actions based on the measurement report.

Embodiment 14: The method of embodiment 13 wherein the one or more actions depend on the status of the respective carrier when the wireless communication device logged the measurement results.

Embodiment 15: A method performed by a network node, the method comprising: receiving (204a) a measurement report from a wireless communication device, the measurement report comprising logged measurement results and information that indicates a status of a respective carrier when the wireless communication device logged the measurement results; and performing (206) one or more actions based on the measurement report.

Embodiment 16: The method of embodiment 15 wherein the status of the respective carrier when logging the measurement results is either that the respective carrier is an overlapping carrier or a non-overlapping carrier.

Embodiment 16A: The method of embodiment 15 wherein an overlapping carrier is a carrier frequency which is configured for cell change procedure in low activity state and also configured for early measurement reporting.

Embodiment 16B: The method of embodiment 16 wherein an overlapping carrier is a carrier which the wireless communication device is actively measuring for mobility and early measurement reporting.

Embodiment 16C: The method of any one of embodiments 16 to 16B wherein a non-overlapping carrier is a carrier frequency which is configured for early measurement reporting but is not configured for any cell change procedure in low activity state.

Embodiment 16D: The method of any one of embodiments 16 to 16B wherein a non-overlapping carrier is a carrier which the wireless communication device is actively measuring for early measurement reporting only.

Embodiment 17: A wireless communication device (112; 700) comprising: one or more transmitters (708); one or more receivers (710); and processing circuitry (702) associated with the one or more transmitters (708) and the one or more receivers (710), the processing circuitry (702)

configured to cause the wireless communication device (112; 700) to perform any of the steps of any of embodiments 1 to 10.

Embodiment 18: A network node (102; 400) comprising: processing circuitry (404; 504) configured to cause the network node (102; 400) to perform any of the steps of any of embodiments 11 to 16D.

Those skilled in the art will recognize improvements and modifications to the embodiments of the present disclosure. All such improvements and modifications are considered within the scope of the concepts disclosed herein.

The invention claimed is:

1. A method performed by a wireless communication device, the method comprising:
   receiving a measurement configuration(s) for performing early measurement on a carrier;
   performing the early measurement on the carrier in accordance with the measurement configuration(s) to provide measurement results;
   determining an overlapping carrier status, at the time of the early measurement, the overlapping carrier status dependent on whether the carrier is an overlapping carrier or a non-overlapping carrier; and
   logging the measurement results along with overlapping carrier status information that indicates whether the carrier is an overlapping carrier or a non-overlapping carrier when logging the measurement results,
   wherein the overlapping carrier is:
      a carrier frequency which is configured for cell change procedure in low activity state and also configured for early measurement reporting; or
      a carrier which the wireless communication device is actively measuring for mobility and early measurement reporting.

2. The method of claim 1 wherein the carrier is the same as a carrier on which a serving cell of the wireless communication device is operating.

3. The method of claim 1 further comprising using the logged measurement results and the overlapping carrier status information to perform one or more operational tasks.

4. The method of claim 3 wherein using the logged measurement results and the overlapping carrier status information comprises sending, to another node, a measurement report that comprises the logged measurement results and the overlapping carrier status information.

5. The method of claim 3 wherein using the logged measurement results and the overlapping carrier status information comprises using the logged measurement results and the overlapping carrier status information locally at the wireless communication device to perform one or more operational tasks.

6. The method of claim 1 wherein the overlapping carrier is a carrier frequency which is configured for a cell change procedure in low activity state and also configured for early measurement reporting.

7. The method of claim 1 wherein the overlapping carrier is a carrier which the wireless communication device is actively measuring for mobility and early measurement reporting.

8. The method of claim 1 wherein the overlapping carrier status of the carrier changes over time while performing the measurements.

9. The method of claim 1 wherein the overlapping carrier status information comprises:
   explicit indications associated with the respective measurement results;
   information that serves as implicit indications of the overlapping carrier status; or
   information that indicates certain events related to changing the overlapping carrier status of the carrier.

10. The method of claim 1 wherein the measurement configuration(s) comprise measuring configurations for early measurement reporting for a plurality of carriers comprising the carrier, and the method further comprises prioritizing measurements on ones of the plurality of carriers having a particular status.

11. The method of claim 1 wherein the wireless communication device has also received a logged Minimization of Drive Test (MDT) configuration.

12. A wireless communication device comprising:
    one or more transmitters;
    one or more receivers; and
    processing circuitry associated with the one or more transmitters and the one or more receivers, the processing circuitry configured to cause the wireless communication device to:
       receive a measurement configuration(s) for performing early measurement on a carrier;
       perform the early measurement on the carrier in accordance with the measurement configuration(s) to provide measurement results;
       log the measurement results along with overlapping carrier status information that indicates whether the carrier is an overlapping carrier or a non-overlapping carrier when logging the measurement results,
       wherein the overlapping carrier is:
          a carrier frequency which is configured for cell change procedure in low activity state and also configured for early measurement reporting; or
          a carrier which the wireless communication device is actively measuring for mobility and early measurement reporting.

13. A method performed by a network node, the method comprising:
    providing, to a wireless communication device, a measurement configuration for early measurement reporting including logging of measurement results along with overlapping carrier status information that indicates whether a respective carrier is an overlapping carrier or a non-overlapping carrier when logging the measurement results,
    wherein the overlapping carrier is:
       a carrier frequency which is configured for cell change procedure in low activity state and also configured for early measurement reporting; or
       a carrier which the wireless communication device is actively measuring for mobility and early measurement reporting.

14. The method of claim 13 further comprising:
    receiving a measurement report from the wireless communication device, the measurement report comprising logged measurement results and the overlapping carrier status information; and
    performing one or more actions based on the measurement report.

* * * * *